Feb. 1, 1966 J. E. DAVIES ETAL 3,233,065
HERMETICALLY SEALED ELECTROMAGNETIC CONTACTORS
Filed Dec. 24, 1962 6 Sheets-Sheet 1

INVENTORS
JAMES E. DAVIES
GEORGE GREGER
PETER J. MIHELICH
JOHN A QUAAL

BY H R Rather
ATTORNEY

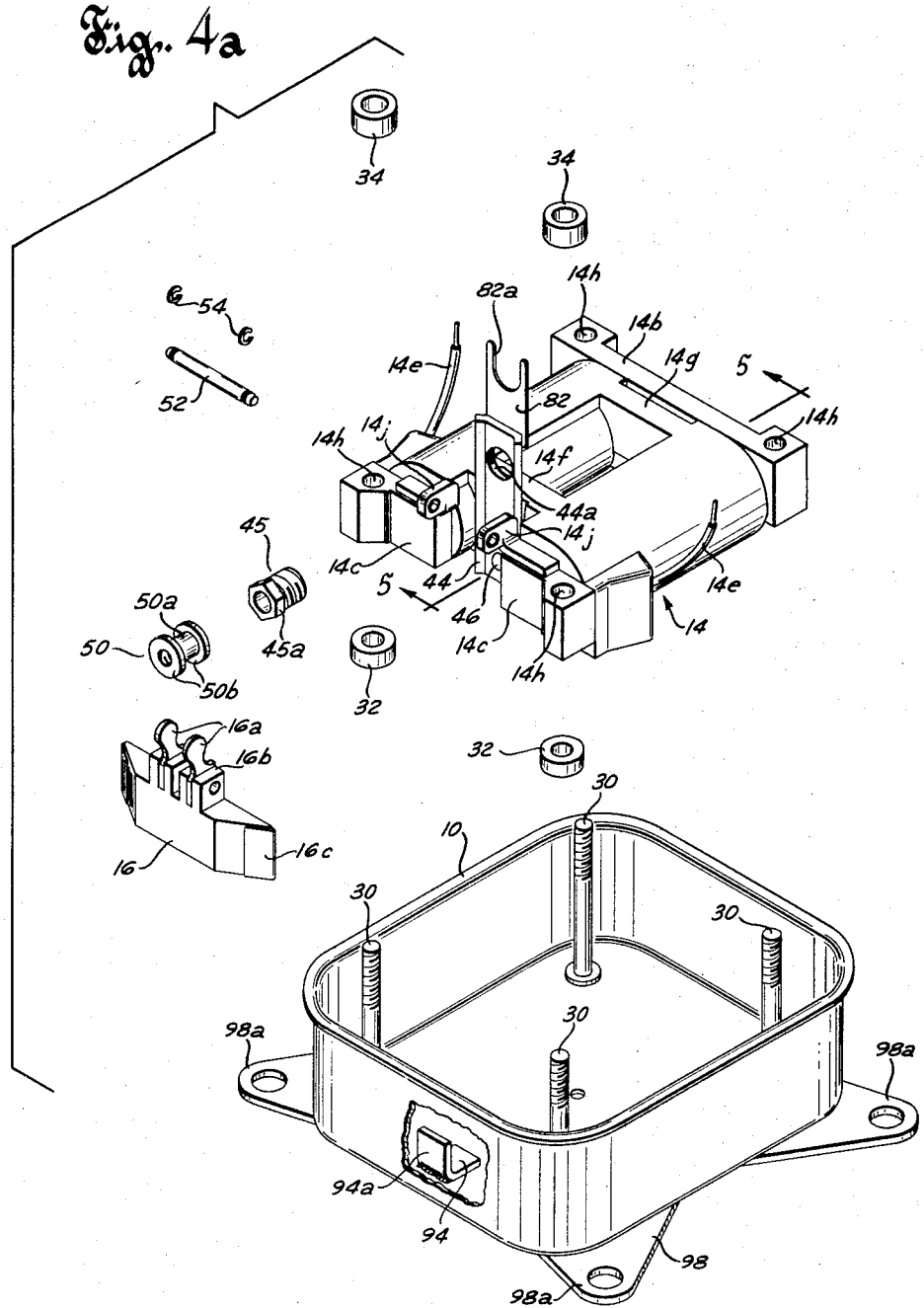

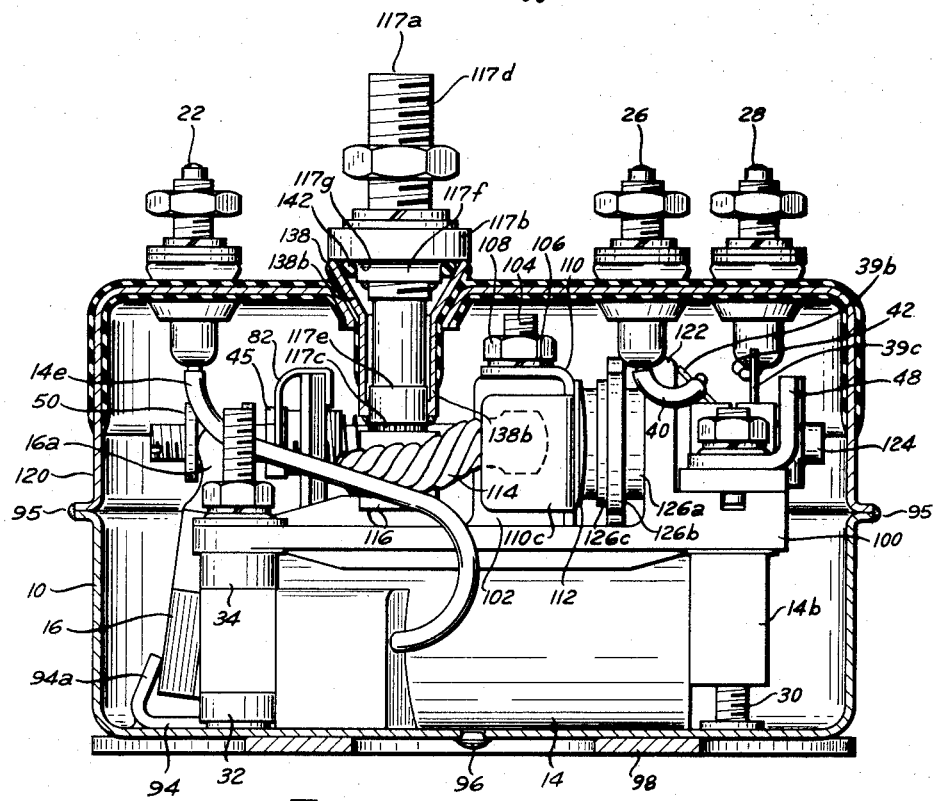
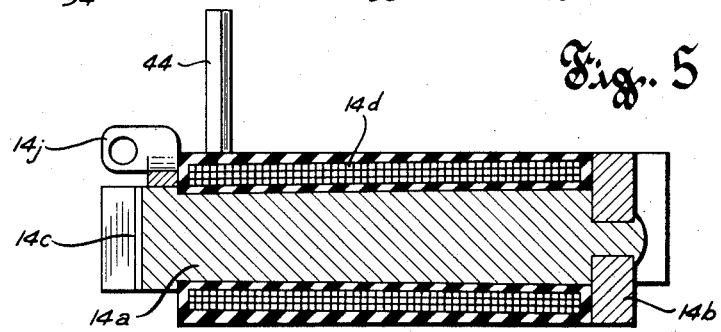

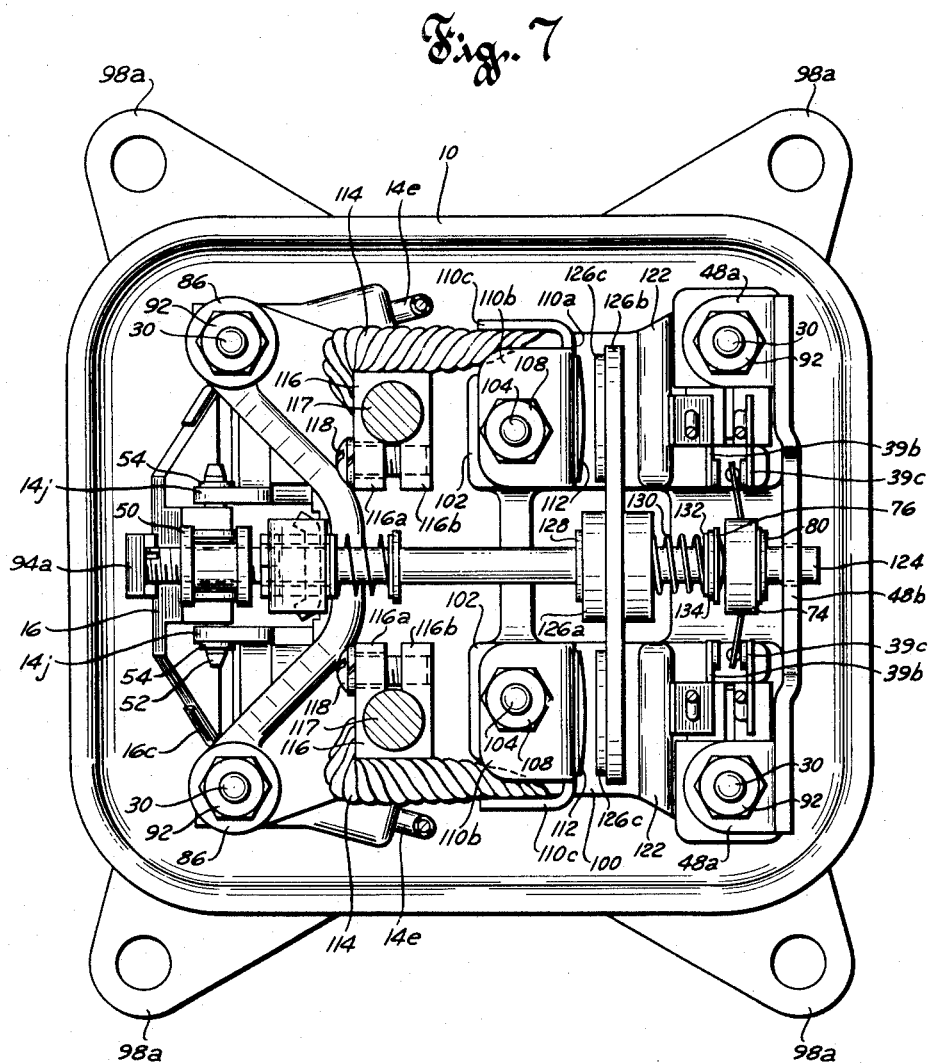

United States Patent Office 3,233,065
Patented Feb. 1, 1966

3,233,065
HERMETICALLY SEALED ELECTROMAGNETIC CONTACTORS
James E. Davies, Whitefish Bay, George Greger, Waukesha, Peter J. Mihelich, Milwaukee, and John A. Quaal, Wauwatosa, Wis., assignors to Cutler-Hammer, Inc., Milwaukee, Wis., a corporation of Delaware
Filed Dec. 24, 1962, Ser. No. 246,812
1 Claim. (Cl. 200—104)

This invention relates to hermetically sealed electromagnetic contactors and to methods of making the same.

The contactors of the present invention are of the type disclosed and claimed in the Davies et al. Patent No. 2,951,133 and constitute improvements.

Electromagnetic contactors of the hermetically sealed type are often used in environments in which vibration and shock stresses abound.

A primary object of the present invention is to provide improved forms of hermetically sealed electromagnetic contactors of designs in which vibration and shock transmitting and amplifying moments are minimized.

Another object is to provide contactors of the aforementioned type which are more compact and reduced in weight.

Still another object is to provide for improvement in structure and methods of assembling of such contactors so that all adjustments of contact and operating mechanism can be accomplished before enclosing thereof transpires.

Other objects and advantages of the invention will hereinafter appear.

The accompanying drawings illustrate preferred embodiments of the invention which will now be described in detail, it being understood that the embodiments illustrated are susceptible to modification in respect of details without departing from the scope of the appended claims.

FIGS. 4a and 4b are exploded views of the contactor;

FIG. 5 is a view taken along the line 5—5 of FIG. 4a;

FIG. 6 is a side view partially in section of a modified form of contactor, and

FIG. 7 is a top plan view with the cover removed of the modified form of contactor.

Figure 1:
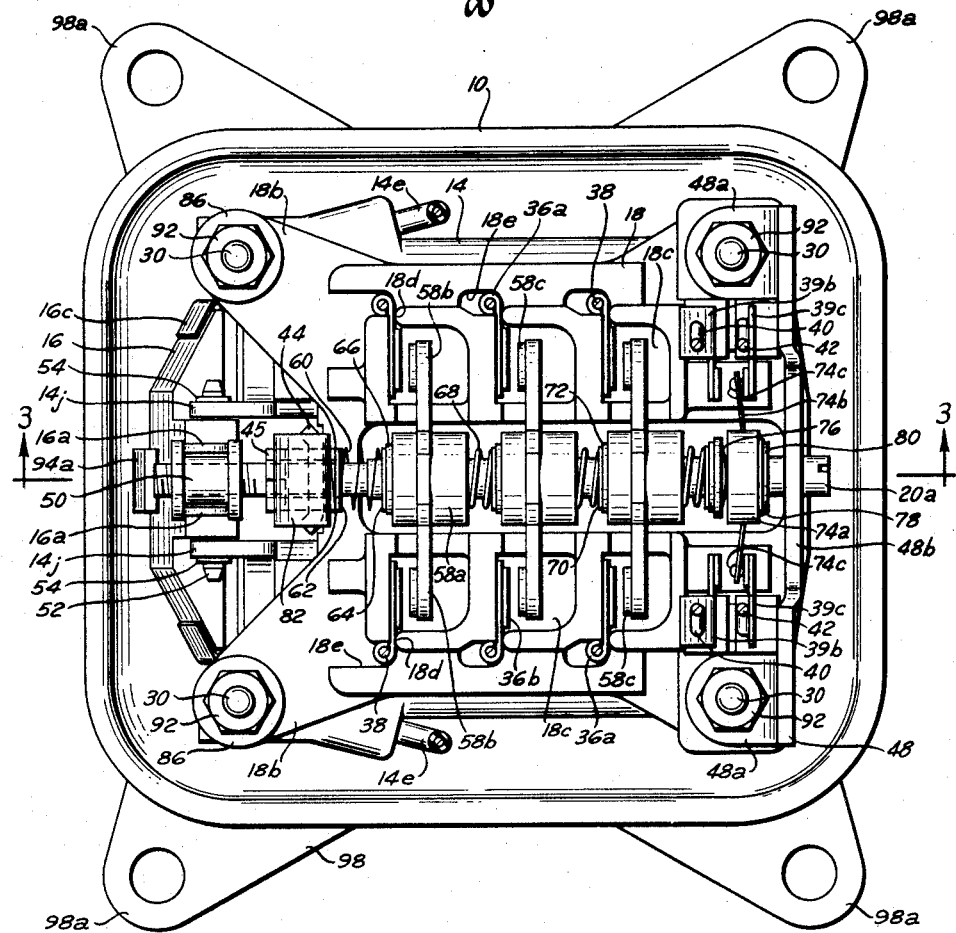
FIGURE 1 is a top plan view of a contactor with cover removed which is constructed in accordance with the invention.

Referring to FIGS. 1 to 5, they show a three pole contactor with auxiliary interlock contacts. More particularly it comprises an enclosing case consisting of a bottom casing 10, a top cover 12, a coil and stationary magnet assembly 14, an armature 16, a contact base 18, a movable contact assembly 20, coil terminals 22, main contact terminals 24 and auxiliary contact terminals 26 and 28.

Coil and stationary magnet assembly 14 comprises spaced apart parallel cylindrical cores 14a formed of magnetic metal which are connected by riveting to an end cross member 14b formed of the same metal. At their other ends each core is provided with pole portions 14c which are separated by an air gap. Coils 14d are wound on the cylindrical portions of each of the cores 14a and the two coils are serially connected so that both are supplied through two coil leads 14e. The cylindrical portion of the two cores and the windings therein are suitably embedded in a molded mass of an epoxy resin which has interconnecting web pertions 14f and 14g spanning the space between the coil wound cores. Cross member 14b and pole portions 14c are provided with openings 14h extending therethrough to provide clearance and mounting of the assembly over studs 30 which are welded to the inner bottom of bottom case 10. Annular spacers 32 are positioned over the studs extending through pole portions 14c between the latter and the inner bottom wall of case 10.

Contact base 18 is provided with clearance openings 18a in registration with the studs 30 and the latter is positioned about these studs and rests on the upper side of coil and magnet assembly 14. Annular spacing members 34 are disposed about the studs 30 between the upper ends of pole portions 14c and the outwardly projecting ears 18b of base 18. Base 18 is provided with three stationary contact chambers 18c on each side of a longitudinally extending passageway. The outer wall of each chamber is provided with a slot 18d extending therethrough to accommodate a stationary contact member 36 and the base adjacent the outer side of each slot is provided with a pocket 18e in which is seated the rolled edge 36a of the contact member 36. The edge 36a of the contact members are tightly rolled and then welded in good electrical engagement with bared ends of lead wires 38. Contact members 36 are each provided with contact tips 36b formed of a silver alloy, weld resistant material. Each of the contact members 36 has a tab 36c which extend through slots in the floor of base 18 and are bent over against the lower surface of the latter to anchor contact members 36 in place.

A pair of auxiliary contact assemblies 39, each of which comprises a molded insulating member 39a and spaced apart stationary contact members 39b and 39c are positioned on base 18 at the end opposite the ears 18b about two of the studs 30. Lead wires 40 connect contacts 39b to terminals 26 and lead wires 42 connect contacts 39c to terminals 28. Contact members 39b and 39c are molded in place in member 39a and the latter are provided with suitable projections (not shown) extending from the lower surface which interfit in rectangular recesses 18f formed in base 18 to locate the auxiliary contact assemblies on base 18 and hold them against displacement.

A bracket 44 is fastened to the web 14f of the molded epoxy material by rivets 46 and adjacent its upper end is provided with a threaded opening 44a. A bushing 45 preferably formed of a material sold under the trade name of "Teflon" is screwed into the opening 44a and accommodates within its bore the plunger 20a of movable contact assembly 20. A combination hold-down and plunger guide member 48 is provided with openings in ears 48a which accommodate studs 30 against auxiliary contact assemblies 39. The web 48b is provided with a central clearance opening to accommodate and guide plunger 20a adjacent an end thereof for axial movement.

Adjacent its other end plunger 20a is threaded and a spool-shaped adjusting nut 50 is screwed thereon. Parallel spaced ears 16a of armature 16 straddle the barrel 50a of nut 50 between its end flanges 50b. Armature 16 is provided with a slotted bracket portion 16b in which the ears 16a are fixed and portion 16b is transversely drilled to accommodate a pivot pin 52 which is afforded pivotal bearing support in opposed bearing brackets 14j on coil and magnet assembly 14. A thin shim 16c formed of beryllium copper is riveted to the sealing face of armature 16 and extensions thereof are bent over the sloping back surfaces of the armature. Pin 52 is retained in brackets 14j by C-shaped clips 54 which fit in annular grooves in the ends of the pin.

Figure 3:
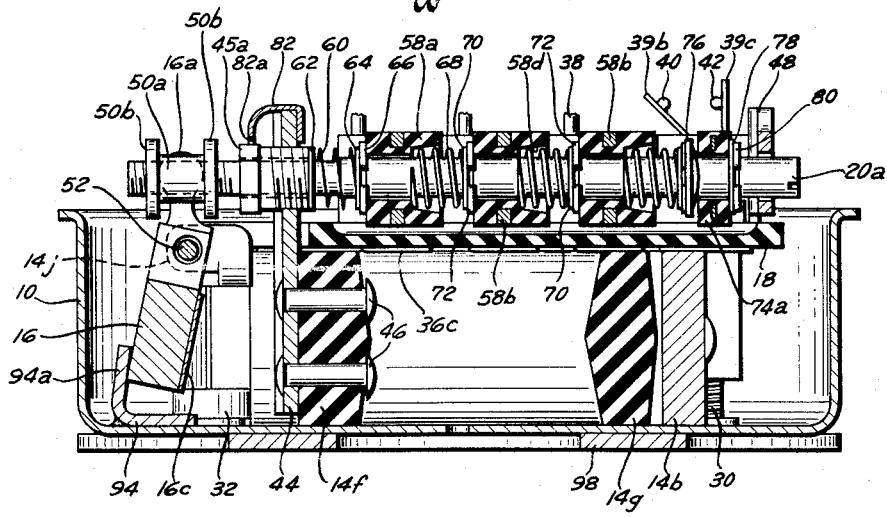
FIG. 3 is a view taken along the line 3—3 of FIG. 1.
Figure 4B:
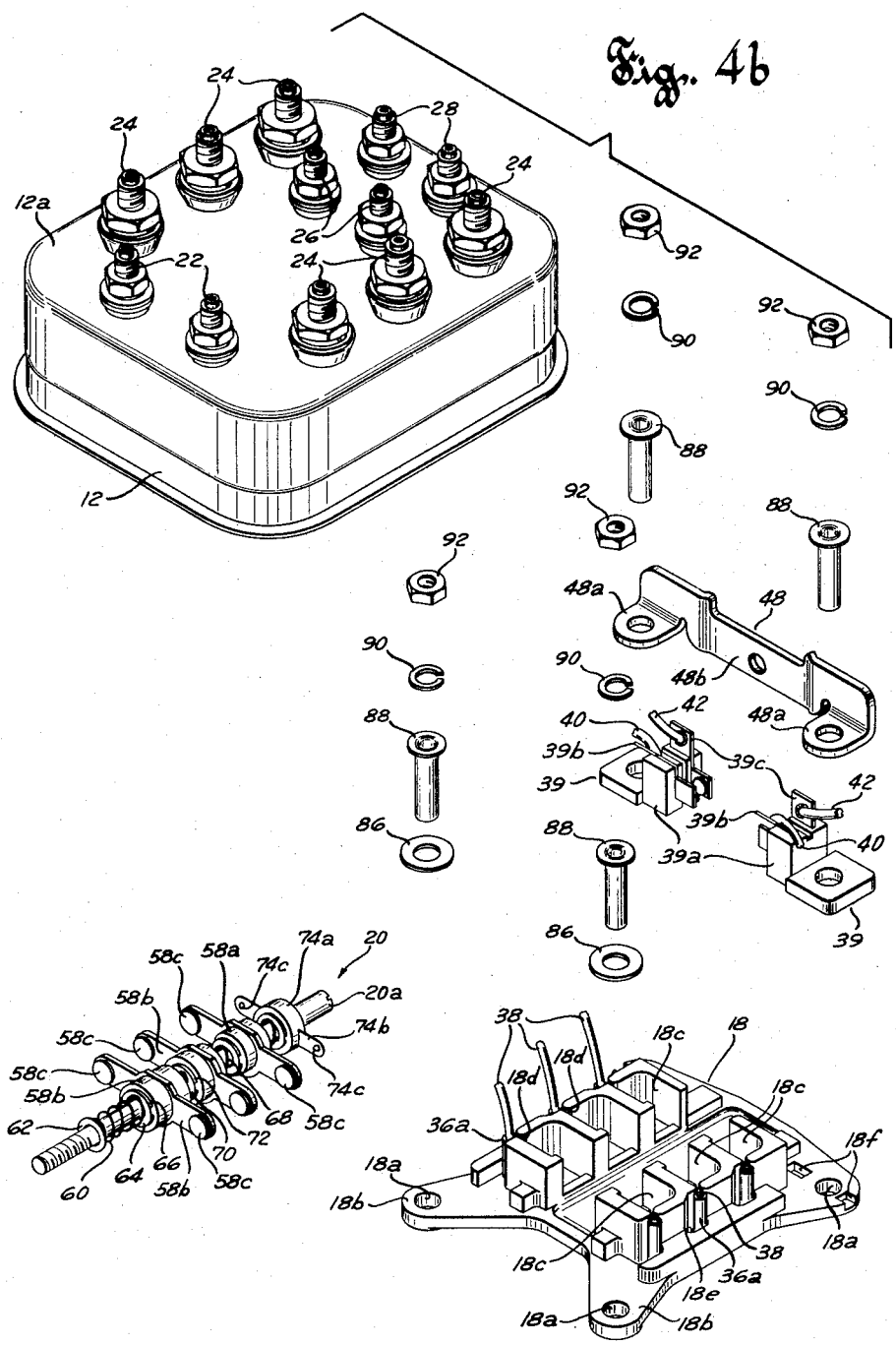

As best shown in FIGS. 1, 3 and 4b, plunger 20a has three movable contactors 58 mounted thereon. Each of the contactors comprises a central molded insulating member 58a which has a central opening to accommodate plunger 20a, a contact member 58b molded in place and comprising a good electrical conducting metal, and contact tips 58c preferably formed of a sintered or coined silver alloy. A compression spring 60 disposed about plunger 20 bears at one end against a washer 62 abutting against one end of bushing 45 and at its other end abuts against a washer 64 which in turn bears against a C-shaped retaining clip 66 secured in annular recess in plunger 20a. One end of the member 58a of a contactor bears against clip 66, and a coiled compression spring 68 disposed about the plunger bears at one end against member 58a within a recess 58d and at its other end against a washer 70 which in turn bears against a C-clip 72 secured in an annular recess in the plunger. The remaining two contactors 58 are similarly fitted on plunger 20a with springs 68, washers 70 and C-clip 72 interposed between them and a preceding contactor. As best seen in FIG. 3, adjacent the right end of plunger 20a, an auxiliary contactor 74 has its central insulating leading member 74a disposed about plunger 20, and a spring metal contact member 74b molded in place in member 74a and having contact tips 74c adapted to bridge alined pairs of contacts on the auxiliary contact assemblies 39. Body member 74a bears at one end against an annular spring washer 76 disposed about plunger 20 and bearing at one side against a retainer clip 72. At its other end member 74a bears against a washer 78 which in turn bears against a C-shaped retaining clip 80 secured to the plunger.

After the stationary contacts 36 and auxiliary stationary contact assemblies 39 are mounted in place on insulating base 18 the latter is mounted atop magnet assembly 14 with its openings 18a in registration with the openings 14h. Plunger 20a with its aforementioned movable contactors 58 and auxiliary contactor 74 mounted thereon is then mounted by inserting its threaded end through bushing 45 and the contact members 58b interposed in the stationary contact chambers 18c with their contact tips alined with the stationary contact tips and contact member 74b interposed in the space between the contact terminals 39b and 39c of stationary contact assemblies 39. A metal tab 82 secured at one side of the upper end of bracket 44 and having a U-shaped notch 82a formed in its free end is used to secure bushing 45 in adjusted position as will hereinafter be described.

Nut 50 is next screwed on the threaded end of plunger 20a and armature 16 then has ears 16a slipped around the barrel 50a, and the transverse opening in its bracket alined with the opening in the bearing brackets 14j. Pin 52 is then slipped into place through the last mentioned alined opening and clips 54 snapped into place.

Member 48 is then mounted on top of the auxiliary stationary contact assemblies 39 and the end of plunger 20a is inserted through the central opening in web 48b. The spacers 32 are then disposed about two of the studs. With spacers 34 interposed between the ears 18b of base 18 and the adjacent surfaces of the pole pieces 14c of stationary magnet 14 in registration with openings 14h and 18a, the assembly of stationary magnet 14, armature 16, and base 18, having auxiliary stationary contact assemblies 39, guide member 48, stationary contacts 36 and plunger 20a mounted thereon as aforementioned, is dropped over the four studs 30 so that the lower surface of the stationary magnet assembly abuts against the inner wall of casing 10. Washers 86 are then placed over the two studs adjacent the movable armature and tubular bushings 88 having outwardly depending flanges at their upper ends are disposed over all four studs and worked down into the spaces between the studs and the peripheral walls lining the openings in the base 18 and stationary magnet 14. Lock washers 90 placed about the studs and nuts 92 taking down on the latter hold the operating assembly fixed in place in casing 10.

With the contactor secured in place in casing 10 adjustments are made to set contact wear allowance, armature open air gap and armature pick-up voltage. With the armature 16 held sealed against pole pieces 14c, nut 50 is adjusted so that the contact tips 58c of the movable contactors engage stationary contact tips 36b, and then given a further adjustment to compress the springs 68 between contactors 58 an amount equal to the desired initial contact wear allowance. An L-shaped stop bracket 94 welded to the inner bottom wall of casing 10 then has its upwardly standing arm 94a bent inwardly when armature 16 is released to provide a desired open air gap between the sealing face of the latter and the faces of the pole pieces 14c.

A sealant such as that sold under the trade name of "Locktite" is then put on the threaded end of plunger 20a in and about the ends of the nut 50 so that the latter will thereafter be held in adjusted position to maintain the previously established contact wear allowance. Nut 45 then is adjusted inwardly or outwardly of bracket 44 to appropriately shorten or lengthen the length of return spring 60 an amount which will resist and prevent movement of armature 16 and the movable contact assembly 20 until a desired pick-up voltage is attained across the terminals 22. With the desired adjustment of nut 45 established tab 82 is bent over the hexagonally sided portion 45a of nut 45 so that it closely straddles opposed parallel sides of the portion 45a within its notch 82a thereby holding nut 45 in adjusted position. It has been found that the non-magnetic shim 16c on the sealing face of armature 16 enhances the consistency of armature release at a desired drop-out voltage.

Figure 2:
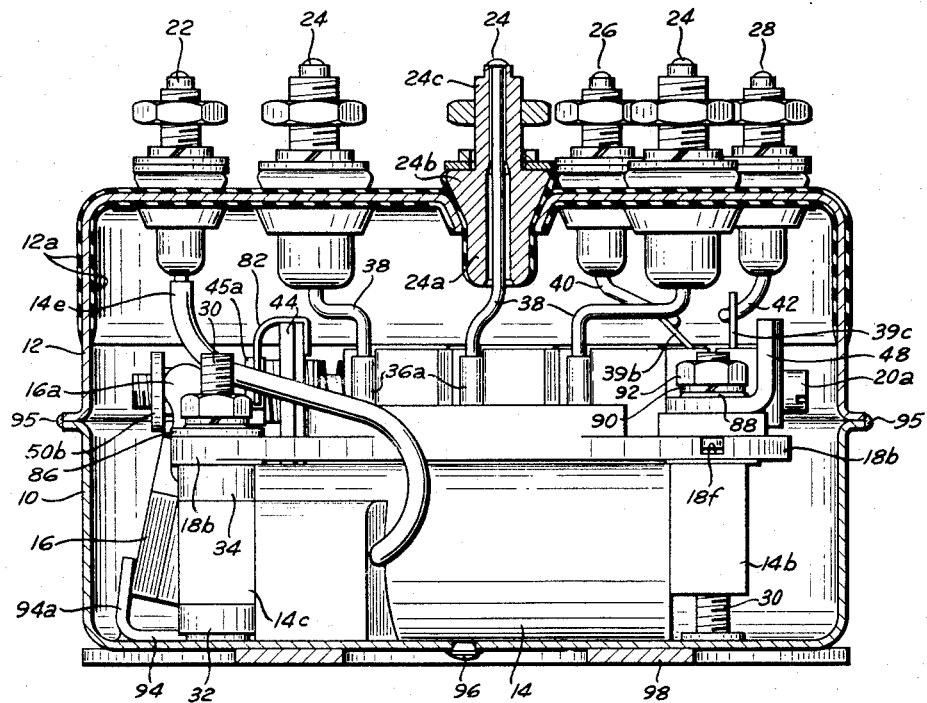
FIG. 2 is side view of the contactor partially in section.

The cover 12 on its upper outer and inner surfaces, and on portions of its outer and inner side walls immediately adjacent thereto is provided with a suitable fused vitreous insulating material 12a. Portions of the upper surface of the cover are provided with inwardly turned flanged openings in which are mounted the terminals 22, 24, 26 and 28. As shown in FIG. 2 the terminals 24 comprise members having lower cylindrical portions 24a, intermediate frusto conical portions 24b and outer screw threaded extensions 24c. The portions 24a and 24b are fused and preferably bonded with the inwardly turned flange in cover 12 in a manner which is more fully described in Davies et al. Patent No. 2,951,133 and in the Higgens Patent No. 2,405,425. The terminals 22, 26 and 28, while of somewhat smaller size, are of the same form and construction as the terminals 24. Each of the terminals have openings extending axially therethrough.

The leads 14e of coils of the stationary armature are inserted upwardly through the last mentioned opening in the terminals 22 and the lead wires 38 connected to the stationary contacts 36 are inserted upwardly through the openings in terminals 24. Similarly, lead wires 40 connected to the auxiliary contacts 39 are inserted upwardly through the opening in terminals 26 and 28. The outwardly turned flanges on cover 12 are then brought into mating engagement about its periphery with the corresponding flange of casing 10 and the mating edges of the flanges are similarly welded along their outer edges as shown at 95 to provide a gas-tight seal.

Excess amounts of the lead wires above the upper end of the studs are then cut off. The outer ends of the terminals are suitably welded to attach the lead wires extending therethrough and to seal off any space therebetween. The final step in the assembly is then performed by filling the enclosure with a selected inert gaseous atmosphere through an opening in an aperture in the bottom wall of casing 10 and thereafter sealing such aperture by welding a plug 96 in the filling aperture.

When no current is flowing into and out of coil terminals 22, the contacts will have the operating condition depicted in FIGS. 1 to 3, wherein all contactors 58 disengage their contact tips 58c from the contact tips 36b of the stationary contacts and auxiliary contact 74 engaging its contact tips 74c with the contact tip of the right-hand most auxiliary stationary contacts 39c. If a voltage of sufficient magnitude is applied across terminals 22 a magnetic force will be built up in stationary magnet 14 sufficient to attract armature 16 and seal the same against pole pieces 14c. Armature 16 in being so attracted pivots on pin 52 counterclockwise and its ears engage against the left-hand end flange of the nut 50, and moves the latter and movable contactor assembly 20 to the left to effect engagement of movable contacts 58 with stationary contacts 36 and auxiliary contact 74 with the left-hand stationary contacts 39b. Upon discontinuance of energizing voltage across terminals 22 and attendant decay of flux in magnet 14 and armature 16, the energy stored in return spring 60 will return the contactor to the initial operating position.

A mounting plate 98 having apertured tabs 98a at the four corners thereof is suitably welded to the bottom surface of casing 10 and provides for securing and attaching the contactor to any suitable panel or other mounting surface.

FIGS. 6 and 7 show a modified form of contactor which is in most respects like that shown in FIGS. 1 to 5, but which has a single main contact set for handling rated currents of at least four times that handled by any one of the main contacts of the first described version. A somewhat different insulating base member 100 is used which has a pair of spaced generally rectangular upstanding bosses 102 formed on its upper surface. Studs 104 are secured in openings in the bosses and lock washers 106 and nuts 108 screwed down on the studs securing stationary contact members 110 to each of the bosses.

Each of the contact members 110 has a front portion 110a to which is secured a contact tip 112, a top portion 110b underlying the lock washer and securing nut, and a side portion 110c which is spaced apart from the outer side of a boss 102. A relatively heavy braided wire conductor 114 is welded at one end to the side portion 110c and at its other end is welded to a clamp 116.

The clamps 116 have central cylindrical openings and a slot through one side. A clamping screw 118 passes through a clearance opening in a portion 116a and takes into an alined threaded opening in the portion 116b. Clamps 116 are secured, as will be hereinafter more fully explained, to the terminals 117 mounted in a cover 120.

Base 100 is provided with upstanding barrier portions 122 opposite each of the stationary contact tips 112. On the opposite sides of these barriers are mounted the auxiliary stationary contacts 39 aforedescribed in conjunction with FIGS. 1 to 5. A plunger 124 is mounted at one end in guide member 48 and in nut 45 in bracket 44 adjacent its threaded end and is axially movable in a passageway formed between the pairs of bosses 102 and barriers 122. A single, main contactor 126 has its insulated body portion 126a mounted on plunger 124 between a retaining ring 128 and a coiled compression spring 130 which at its other end abuts against a washer 132, that in turn abuts against a C-clip 134 secured to plunger 124. A contactor 126b moulded in place on body portion 126a has contacts 126c secured at opposite ends that are movable into and out of engagement with contacts 112.

Cover 120 is similar in form and construction to cover 12, but in place of the six terminals 24 has the two terminals 117 of a somewhat different construction and higher current carrying capacity to conform to the stationary contacts 112 and movable contact 126. Each of the terminals 117 comprises a stud 117a and a collar 117b. Stud 117a at its lower end 117c is of a serrated formation, and has a threaded upper end 117d and an enlarged intermediate portion 117e.

A sleeve 138 having a frusto conical portion 138a and an integral cylindrical portion 138b is bonded and fused with solidified vitreous material along its portion 138a with the inwardly turned complemental flange surrounding a receiving opening in cover 120. Collar 117b is internally threaded and when appropriately adjusted in position on stud 117a is soldered to stud 117a. A rubber seal ring 142 preferably formed of a synthetic rubber such as neoprene is seated on the shoulder between the portions 117f and 117g of the collar. In assembling the stud to the cover the stud 117a is first inserted into the portion 138a and down through portion 138b so that portion 117e hugs an inner wall of portion 138b adjacent the end of the latter. The studs 117 are then brazed to the portion 138b along the end of the latter in a hermetically sealed relation. The ring 142 expands between collar 117b and the inner wall of portion 138a to provide a seal against entrance of moisture between the stud and sleeve.

In assembling cover 120 to casing 10 the leads 14e and 38 from the magnet coil and auxiliary stationary contacts are fed through their respective terminals 22, 26 and 28 as aforedescribed. Then the clamps 116 are placed over the serrated ends 117c of the studs and the clamping screws 118 tightened to provide a good electrical connection between the terminals and stationary contacts. Cover 120 is then welded closing casing 10 and the assembly completed as aforedescribed in conjunction with the embodiment shown in FIGS. 1 to 5.

We claim:
In a hermetically sealed electromagnetic contactor,
(a) a metallic enclosure having at least two parts which are hermetically sealed and joined together, one of said parts having a plurality of members secured to the inner side of the wall of greatest area and another of said parts having a plurality of terminals extending through, insulated from and hermetically bonded to a wall thereof which is opposite that of said one part,
(b) an electromagnetic operating mechanism mounted on said members and comprising a generally rectangular core having a pair of legs which are equally spaced from said inner side of said wall of said one enclosure part on which are wound serially connected coils and having separate pole faces at corresponding ends, and further comprising an armature pivotally mounted for movement into and out of engagemnet with said pole faces, and
(c) a contact mechanism which is separately mounted on but secured together with said operating mechanism on said members within the confines of the lateral area of said operating mechanism and comprising
(d) a plurality of pairs of alined stationary contacts
(e) a one-piece insulating base having individual arc chambers in which each of said stationary contacts are mounted, said contacts each having an anchoring tab extending through and bent over the outer surface of said base and having a portion extending through an outer side wall slot in its arc chamber which is clinched about a flexible conductor that has connection with a terminal member individual thereto
(f) a plurality of contactors movable into and out of engagement with said pairs of contacts and
(g) an operator for said contactors reciprocably movable by said armature parallel to the longitudinal axes of the coil wound core legs.

References Cited by the Examiner
UNITED STATES PATENTS

| | | | |
|---|---|---|---|
| 2,405,319 | 8/1946 | McMaster et al. | 200—87 |
| 2,561,450 | 7/1951 | Russell | 200—144 |
| 2,946,872 | 7/1960 | Siebers | 200—98 X |

BERNARD A. GILHEANY, *Primary Examiner.*
ROBERT K. SCHAEFER, *Examiner.*